(12) United States Patent
Hutchison et al.

(10) Patent No.: US 11,200,003 B2
(45) Date of Patent: *Dec. 14, 2021

(54) BOUNDED LATENCY AND COMMAND NON SERVICE METHODS AND APPARATUS

(71) Applicant: Western Digital Technologies, Inc., San Jose, CA (US)

(72) Inventors: Neil Hutchison, Hudsonville, MI (US); Peter Grayson, Grand Rapids, MI (US); Xinde Hu, San Jose, CA (US); Daniel L. Helmick, Broomfield, CO (US); Rodney Brittner, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/925,185

(22) Filed: Jul. 9, 2020

(65) Prior Publication Data

US 2020/0341688 A1 Oct. 29, 2020

Related U.S. Application Data

(63) Continuation of application No. 16/169,863, filed on Oct. 24, 2018, now Pat. No. 10,732,900.

(51) Int. Cl.
| | |
|---|---|
| *G06F 3/06* | (2006.01) |
| *G06F 12/02* | (2006.01) |
| *G06F 13/16* | (2006.01) |
| *G06F 11/07* | (2006.01) |

(52) U.S. Cl.
CPC .......... *G06F 3/0659* (2013.01); *G06F 3/0611* (2013.01); *G06F 3/0673* (2013.01); *G06F 11/0757* (2013.01); *G06F 12/0246* (2013.01); *G06F 13/161* (2013.01);
(Continued)

(58) Field of Classification Search
CPC .... G06F 3/0611; G06F 3/0659; G06F 3/0673; G06F 11/0757; G06F 13/161; G06F 13/1642; G06F 2201/81; G06F 2201/835; G06F 2212/1024
See application file for complete search history.

(56) References Cited

U.S. PATENT DOCUMENTS

| | | | |
|---|---|---|---|
| 8,417,812 | B1 | 4/2013 | Gulati et al. |
| 2002/0031086 | A1 | 3/2002 | Welin |
| 2009/0292865 | A1 | 11/2009 | Hong |

(Continued)

OTHER PUBLICATIONS

Black NVM Express Technical Proposal for New Feature—Technical Proposal ID 4033—Enhanced Command Retry, Change Date May 10, 2018, Builds on Specification NVM Express 1.3, 11 pages, Copyright © 2007-2018 NVM Express, Inc. All Rights Reserved.

(Continued)

*Primary Examiner* — Reginald G Bragdon
*Assistant Examiner* — Aaron D Ho
(74) *Attorney, Agent, or Firm* — Patterson & Sheridan, LLP; Steven H. Versteeg

(57) ABSTRACT

The present disclosure generally presents a method and apparatus to provide a bounded latency, where a device would report "non-service" of a command at the defined system level timeout or earlier if the device was unable to successfully return the data to the host.

20 Claims, 4 Drawing Sheets

(52) U.S. Cl.
CPC ...... *G06F 13/1642* (2013.01); *G06F 2201/81* (2013.01); *G06F 2201/835* (2013.01); *G06F 2212/1024* (2013.01)

(56) References Cited

U.S. PATENT DOCUMENTS

| | | |
|---|---|---|
| 2010/0106820 A1 | 4/2010 | Gulati et al. |
| 2011/0058554 A1 | 3/2011 | Jain et al. |
| 2011/0246821 A1 | 10/2011 | Eleftheriou et al. |
| 2014/0059270 A1 | 2/2014 | Zaltsman et al. |
| 2016/0188206 A1 | 6/2016 | Sinclair |
| 2018/0159778 A1 | 6/2018 | Lee et al. |
| 2018/0165016 A1 | 6/2018 | Malina et al. |
| 2018/0275923 A1* | 9/2018 | Earhart ................. G06F 3/0653 |
| 2019/0303024 A1 | 10/2019 | Iwai et al. |
| 2019/0324658 A1 | 10/2019 | Walsh |

OTHER PUBLICATIONS

Adamchik, Victor, "Binary Heaps"; hosted by Carnegie Mellon University; https://www.cs.cmu.edu/-adamchik/15-121/lectures/Binary%20Heaps/heaps.html; 2009 (4 pages).

E. Bensley et al.; "Object-oriented Implementation of an Infrastructure and Data Manager for Real-Time Command and Control Systems", Proceedings of WORDS '96. The Second Workshop on Object-Oriented Real-Time Dependable Systems, Laguna Beach, CA, USA, 1996 (9 pages).

\* cited by examiner

BOUNDED LATENCY AND COMMAND NON SERVICE METHODS AND APPARATUS

CROSS-REFERENCE TO RELATED APPLICATIONS

This application is a continuation of co-pending U.S. patent application Ser. No. 16/169,863, filed Oct. 24, 2018, which is incorporated by reference herein in its entirety.

BACKGROUND OF THE DISCLOSURE

Field of the Disclosure

Embodiments of the present disclosure generally relate to a reducing latency in computer applications. More specifically, aspects of the disclosure relate to limiting latency for computer applications within a predefined required response time.

Description of the Related Art

Latency in host read commands is an industry problem that is related to drive effects, die collisions, channel collisions or long low density parity check ("LDPC") decode times. Often, when these problems are encountered, the time that is required to notify the host that the data would not be available within a given service duration is exceeded, causing user and processing delay. The industry, however, desires to have 100% guaranteed latency to the host.

In current industry solid state drive ("SSD") deployments as well as hard disk drives, attempts to limit latency involve replicating user data across multiple physical drives, or non-volatile memory ("NVM") sets within a single drive, allowing multiple sources for the data. Manufacturers of computer systems require lower latency to access the data, and features such as read recovery levels with "fast fail" in the NVMe spec to limit the error recovery and tail latency. In these conventional attempts to limit latency by using multiple sources for the same data, if a first source cannot provide the data within a given time window, the host, i.e. a computer, would like the drive to report back read failure, allowing a second source to be used to fetch the data within the required time. The industry perception is that by limiting, or preventing read recovery of host data using methods such as soft bit decode in LDPC, or XOR recovery in the case of die failure, a better overall service to an end user can be provided due to the structure of the storage, containing multiple copies.

An additional feature in the NVMe specification called "limited retry" attempts to specify exactly this behavior by defining a global timeout, defined in units of 100 ms. The "limited retry" command tags commands to be "limited retry" when an initial attempt at reading the data was unsuccessful in order to attempt to provide data to a user within the required latency limits established. When the drive starts a process for recovery of the data, such as soft bit recovery, a timer is started for that command. If the timer expires before the recovery of the data is complete, the command is reported as failed. Note that this approach does not account for the latency to reach the first read attempt, which in itself may be subject to die collisions, and long decode times for the hard decode portion of the initial read. As such, the latency is not guaranteed, and only serves to ensure that recovery is not unbounded.

These approaches do not take into account the initial command processing times and other system operations such as host write, log write, reclaim, block erase, XOR parity writes, etc. which can push out the initial time to read the host data. These approaches, therefore, can significantly exceed the latency time requirements of manufacturers.

There is a need to provide a method and apparatus that will ensure that latency limits set on retrieving data are not exceeded.

There is a further need to provide a method and apparatus that will allow different latency limits to be set on retrieving data such that the systems and methods used are flexible across a large number of potential uses.

There is a further need to provide a cost effective method to limiting latency for data retrieval limits.

SUMMARY OF THE DISCLOSURE

The present disclosure generally presents a method and apparatus to provide a bounded latency, where a device would report "non-service" of a command at the defined system level timeout or earlier if the device was unable to successfully return the data to the host.

In one embodiment, a method is disclosed comprising receiving a command at a flash translation layer; timestamping the command received at the flash translation layer, adding the command received at the flash translation layer to a queue, starting a timer when the command is added to the queue, wherein a value of the timer is set according to a required latency threshold, performing a query to determine if the value for the timer has exceeded the required latency threshold, when the timer has exceeded the required latency threshold, checking each of the commands in the queue to determine if the required latency threshold has been exceeded and sending a message to a host that the latency threshold has been exceeded for each command in the queue.

In another embodiment, an apparatus is disclosed comprising means for receiving a command at a flash translation layer, means for timestamping the command received at the flash translation layer, means for adding the command received at the flash translation layer to a queue, means for starting a timer when the command is added to the queue, wherein a value of the timer is set according to a required latency threshold and means for performing a query to determine if the value for the timer has exceeded the required latency threshold.

In another embodiment, a method is disclosed comprising receiving a command at a flash translation layer, wherein the command is required to be performed at a specific die, timestamping the command received at the flash translation layer, adding the command received at the flash translation layer to a queue; starting a timer when the command is added to the queue, wherein a value of the timer is set according to a required latency threshold, performing a query to determine if the value for the timer has exceeded the required latency threshold, when the timer has exceeded the required latency threshold, checking each of the commands in the queue to determine if the required latency threshold has been exceeded, sending a message to a host that the latency threshold has been exceeded for each command in the queue, checking the commands in the queue for a latency for completion compared to the latency threshold, and notifying a host for each command where an expected completion latency exceeds the latency threshold.

In another example embodiment, a method is disclosed comprising receiving a command at a flash translation layer, wherein the command is required to be performed at a specific die, timestamping the command received at the flash translation layer, adding the command received at the flash translation layer to a queue, starting a timer when the command is added to the queue, wherein a value of the timer is set according to a required latency threshold, checking the commands in the queue, per die, for a latency for completion compared to the latency threshold and notifying a host for each command where an expected completion latency at a die exceeds the latency threshold.

In another non-limiting example embodiment, an apparatus is disclosed comprising: memory means with at least two die, means for receiving commands at a flash translation layer, wherein the command is required to be performed at a specific die, means for timestamping received commands at the flash translation layer, means for adding the command received at the flash translation layer to a queue, means for starting establishing a lapsed time when the command is added to the queue; means performing a query to determine if the value for the timer has exceeded the required latency threshold, and when the timer has exceeded the required latency threshold, means for checking each of the commands in a queue to determine if the required latency threshold has been exceeded.

In another example embodiment, an arrangement is disclosed comprising means for receiving a command at a flash translation layer, wherein the command is required to be performed at a specific die; means for timestamping commands received at the flash translation layer, means for providing a queue of commands received at the flash translation layer, means for starting a timer when the command is added to the queue and means for checking the commands in the queue, per die, for a latency for completion compared to the latency threshold.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures.

It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Figure 1:
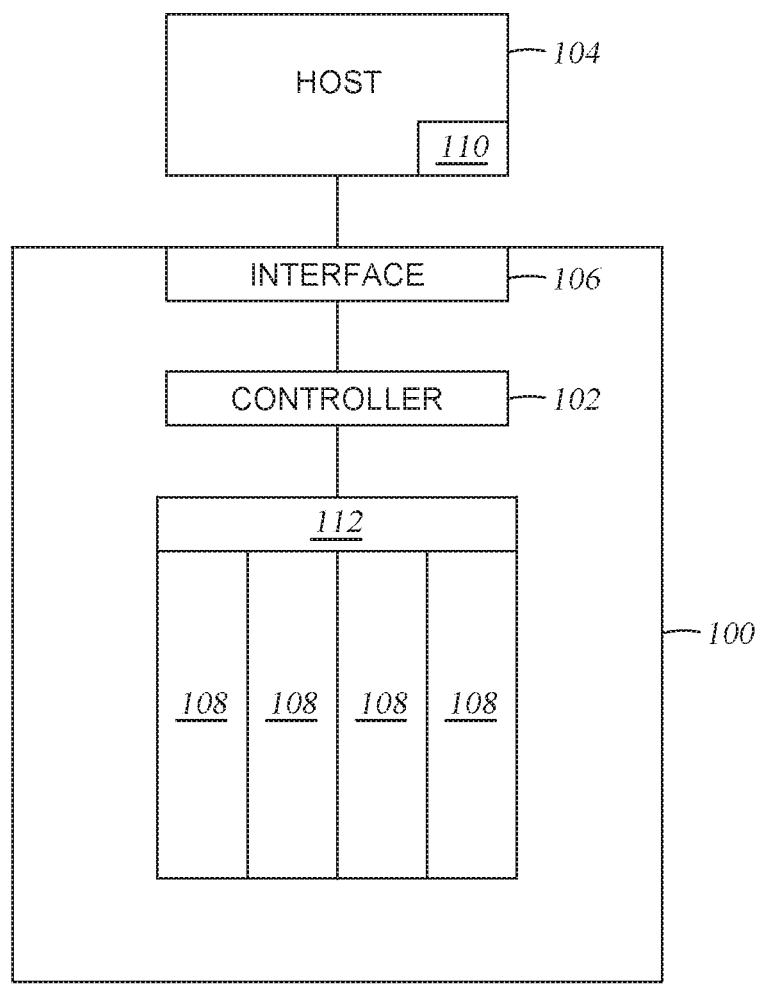
FIG. 1 is a schematic diagram of a host and connected SSD.

Referring to FIG. 1, a schematic representation of a solid state drive 100 is illustrated. The solid state drive 100 is a unit that may be used in a computer or a server. The solid state drive 100 utilizes a memory to store information such that the information may be retrieved at the desire of a user. In the instant case, the solid state drive 100 uses a flash memory, such as a NAND flash memory 108. Although described as a NAND flash memory, other types of memory other than NAND flash may be used and the description of a NAND flash memory should not be considered limiting. Other embodiments may also be applicable, including hard disk drives, tape drives, optical storage, PCM, ReRam, Persistent Memory, Storage Class Memory, TLC, MLC, Low Latency NAND, FastNAND, ZNAND, MRAM.

A controller 102 is provided in the solid state drive 100 to perform functional operations that are needed by a host 104. The host 104 sends information, such as a request to store data, to the controller 102 such that the instructions are received and processed by the controller 102. The controller 102 may be configured with a host interface module 106 to allow the controller 102 the ability to communicate with the host 104. The communication protocol between the controller 102 and the host 104 may be any typical communication protocol, such as TCP/IP, PCIe, IPX/SPX, AppleTalk, Serially Attached SCSI (SAS), SCSI, SATA, PATA, NVMe, NVMeoF, OpenChannel SSD (OCSSD), Cache Coherent Interface Accelerator (CCIX), or GenZ. Dual or multiple communication protocols are also within contemplation of the present disclosure.

The controller 102 may be a complicated design or a simple design when incorporated into the solid state drive 100. In an attempt to decrease the complexity of the controller 102, aspects presented herein attempt to minimize certain aspects or functions of the controller 102. By limiting the functions performed by the controller 102, the corresponding economic cost of the controller 102 is reduced, the controller 102 is more cost effective to manufacture and potential errors by the controller 102 are minimized.

A typical function of the controller 102 is to provide instructions and/or communication on the acceptance and routing of data to the NAND flash 108. The controller 102 in the illustrated embodiment is an "on chip" controller 102 where the control mechanism is placed on a computer chip that has been created for the purpose of providing instructions to other sections of the solid state drive 100 and provide for and interface with the host 104. The controller 102 may be used to transfer data from the NAND to the host DRAM and back, as needed.

The controller 102 may provide for logical block address mapping of the logical to physical location of data stored within the NAND. The controller 102 may also be configured to perform functions of wear leveling. The controller 102 may also be provided the capability to provide for bad block identification and management, read disturb management, ECC encoding, and ECC decoding as well as data scrambling, Error Detection Codes (LBA, CRC) or Error Correction Codes (LDPC, BCH or similar).

As flash memory, such as NAND flash can only perform a limited number of program cycles, the controller 102 may be configured with different algorithms that provide for wear-leveling. These algorithms may be updated, over time, to account for different status of memory arrangements and how many program erase cycles have been performed.

Garbage collection functions may also be handled by the controller 102. As explained above, as the number of program cycles is finite, it is generally advantageous to write to all of the memory arrangements at least once before erasing different memory arrangements. Once the memory arrangements have been written to, memory arrangements that contain old data need to be erased to provide for more room for data storage. The erasure of old data, defined as garbage collection, may be undertaken by the controller 102.

Aspects described herein accomplish the writing, reading and error checking responsibilities by using data latches and the NAND flash 108. For definition, a latch is defined, in one non-limiting embodiment, as a circuit that has two stable states and that is used to store information. The latch may be switched or flip-flopped, from one of the stable states to another through actuation. Such actuation will allow a different function to be performed or depending upon the configuration, a set of data (0 or 1) to be stored.

The host 104 is provided with DRAM 110 that provides memory for computer functions to be produced.

The description below describes methods and apparatus and how the methods and apparatus operate together to provide a better Quality of Service ("QoS") to the host.

In embodiments, a host system may be a personal computer or a server that requires data from a memory device, such as an SSD. In order for the host system to understand the state of the data on the memory device, when a command fails, the reason for failure needs to be improved. Conventional apparatus and methods only identify that a time limit has been exceeded when a set of data is requested. Such conventional approaches to exceeding a latency limit merely report the data request command as failed, which is counted towards an uncorrectable bit error ("UBER") event for the drive. Aspects of the disclosure aim to break that assumption made in conventional apparatus and methods, and provide information as to why the command failed, whether the reason is related to an UBER event, data that could be recovered but the device did not attempt recovery due to latency impacts, or the non-service of the command, due to device impacts meaning that the command would not meet the expected latency.

The last case of non-service is a new category, and forms the basis of the invention, as described below. A non-service command is a new term used in this document to mean the command was canceled without attempting to complete all portions of the normal command flow. This may mean that a readcommand is non-serviced prior to looking up the location of the data on the media due to the timeout, a read command is non-serviced after proceeding through the L2P look-up and it is placed on the die queue for scheduling on the NAND die and the NAND die is recognized to have too long of a QD to expect serving, the command may be non-serviced if the ECC decode is continuing to iterate (in the case of an LDPC decode engine) and the deeper recovery stages are not going to be initiated due to the length of their predicted time will exceed the command service allowable time, etc.

In another embodiment, in order to report these new failure modes to the host, changes to the error reporting status in the commands for the host protocol would be required.

Definition of command latency: In order to bound the latency in the system, a command latency is defined, wherein the command latency is the amount of time taken by the system to service a command. The same approach as used in the limited retry feature described above and already in the NVMe spec is used, with the option to either have a global drive setting applying to all commands, or individual command tagging as options. The timeout unit is defined in units of nanoseconds, which is more in line with the expectations of today's drive technology. As will be understood, different variations of the amount may be used.

Non-Service of Commands: With the number of concurrently executing commands in the system increasing, referred to hereafter as Host Queue Depth ("HQD"), the likelihood of commands being serviced on the same NAND Channel (Toggle Mode Bus), controller, sub-controller, Endurance Group, NVM Set, LUN, or from the same NAND die is increasingly more likely. As the QD increases, the probability of these events also increases. Open NAND flash interface ("ONFI") and proprietary non-volatile media communication channels are protected. As will be understood, non-service of commands may be performed on any individual command or grouping of commands being over driven from an expectation of resources within an allocation. These may include, but not be limited to reads per block, reads per plane, reads per die, reads per TM channel, programs per die, programs per plane, programs per TM channel, as well as erases for the above commands, reads per ECC decode engines, programs per ECC encode engine, combined reads, writes and erases per die, combined reads and writes per internal controller, DMA engine resources for combined reads and writes per internal SRAM throughput capabilities; combined reads and writes per internal DRAM bandwidth capabilities and the number of logical to physical translations requested of the logical to physical manager.

The Flash Translation Layer ("FTL") has knowledge of all ongoing operations in the NAND die 112 in the system, and once translation of the host LBA to flash address is complete for a given command, the FTL knows the NAND die that the command will be sent to. Using this system knowledge, the FTL may choose not to send the command to the NAND because there may already be a number of commands ahead of this command for that die, meaning that it would not be possible to complete the command within the requested QoS, in one non-limiting example embodiment. The FTL could initiate a command completion indicating the non-service of the command, within some shorter (~10 us) time than the requested limit allowing the host to request the data from an alternate source, which would be able to read the data in a shorter timeframe than this device. This type of command non-service is not an indication of UBER of the drive, but a system decision to permit the host to provide overall better end latency, by using the multiple sources for the user data.

Implementation on the FTL is described below. When a command is received in the FTL, the command is timestamped (note that the Host Interface Module 106 ("HIM") may also perform this step). The command is added to a heap, which stores the time to the next command's timeout. This event driven process uses the heap, in one non-limiting embodiment, to identify when the next command should be checked for timeout, so only a single timer is required, and not a timer per command. When the timer expires, the heap will be checked for all commands which have reached or exceeded the timeout value. In other embodiments, a sorted heap may be used, as well as a sorted list, an unsorted list and easiest insertion list or other data organizing structure.

If a command has exceeded the timeout, a host response will be sent with the reason for the "command timeout" or a read failure or vendor specific error. From this point onward, the HIM 106 will manage any data transfer requests from the flash, and send the data to a bit bucket, and not the host, ensuring that we do not fail the command, then later send data to the host violating expected host-device acceptable protocol relationships for NVMe.

The method here using an event driven timer approach means the solution can be implemented in only the FTL. In the embodiment illustrated in FIG. 1, the flash translation layer is located within the solid state drive 100, namely the controller 102. In other embodiments, the flash translation layer may be located within the host 104 and use host processing capabilities. In other embodiments, the HIM 106 may also have a list (sorted or unsorted) and it is desired to identify instances where a timed out condition is present and to limit the FTL from repeatedly sending time out conditions for activities that have already been notified as timed out. In these embodiments, lists containing timed out conditions are not passed to the FTL, but rather handled by the HIM 106 directly.

Figure 2:
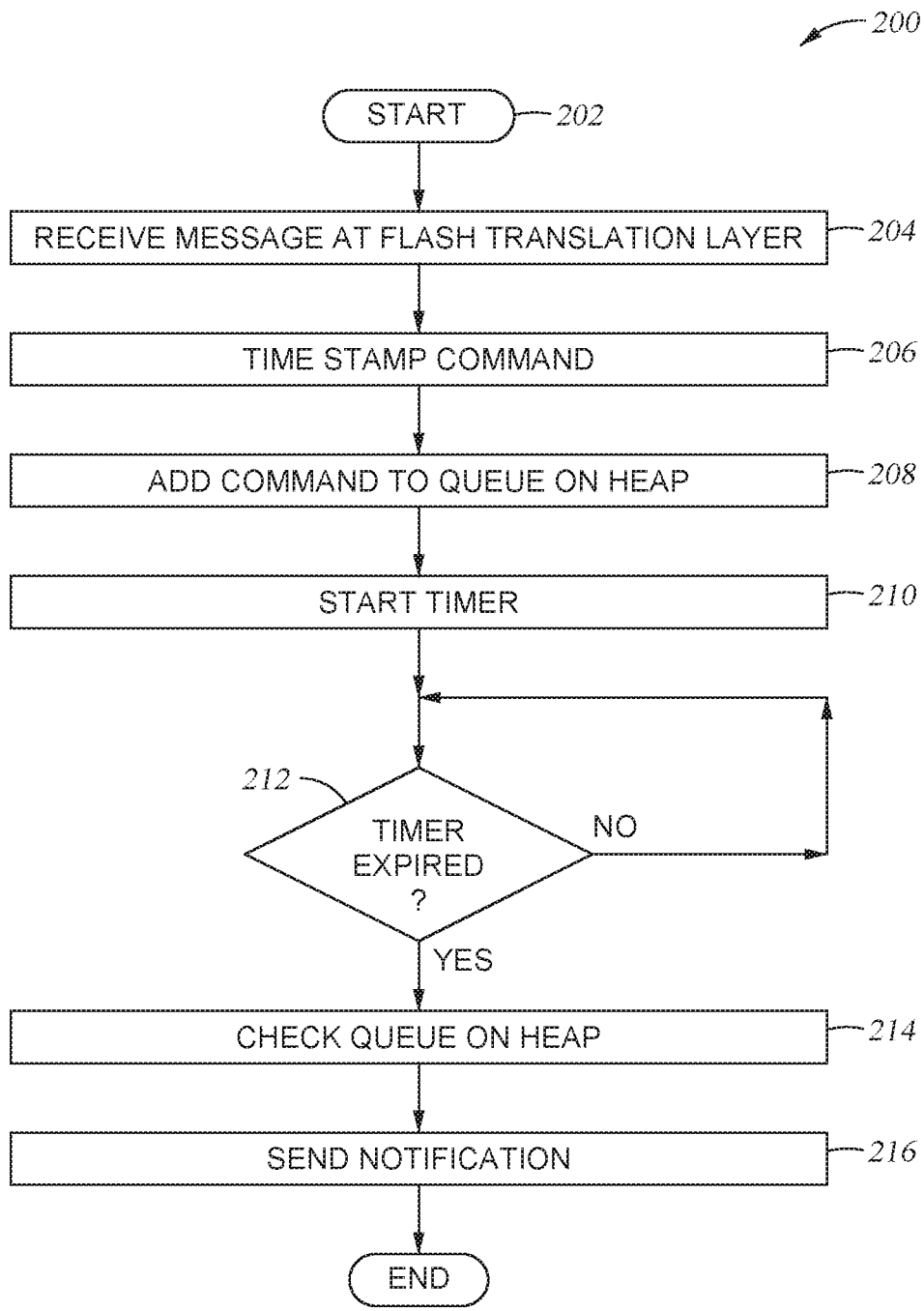
FIG. 2 describes a method for reducing a latency of computer operations in one example embodiment.

Referring to FIG. 2, a method 200 describing the above is illustrated. The method starts at 202. The method proceeds to 204 where a command is received at the flash translation layer. The command is timestamped at 206. The command is then added to a queue or "heap" of commands that need to be processed at 208. A timer is started at 210 when the command is added to the heap.

The queue can store the time for the next command "timeout", the period of time when a latency threshold will be exceeded. In the method described, a single timer is used for the next command. In other embodiments, multiple timers may be used, one for each command in the "heap". At 212, a query is run to determine if the timer started at 210 has expired. If the timer has not expired for the next command to be performed in the heap, then the method loops back to 212 where the timer is checked again. If, at 212, the query is run and the timer has expired, then, at 214, the heap is checked to see if any of the individual commands have exceeded their time out. If, a command is expired, then a notification is sent back to the host at 216 that a "timeout" has occurred. If a command has not expired the timeline, then the command stays in the heap. In embodiments that the command has exceeded the time out, the command may be removed from the heap.

Figure 3A:
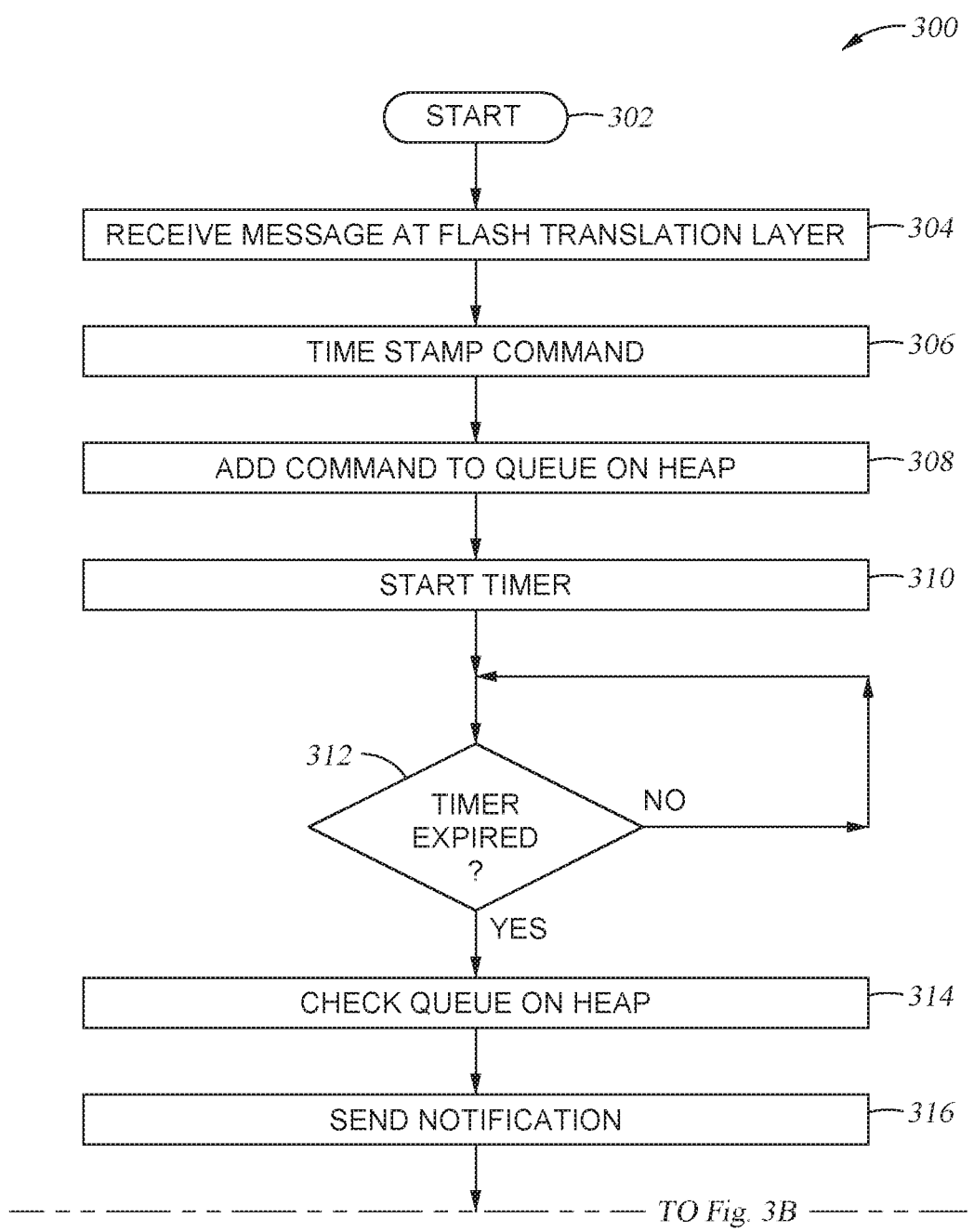
FIGS. 3A and 3B describe a method for reducing a latency of computer operations in a second example embodiment.
Figure 3B:
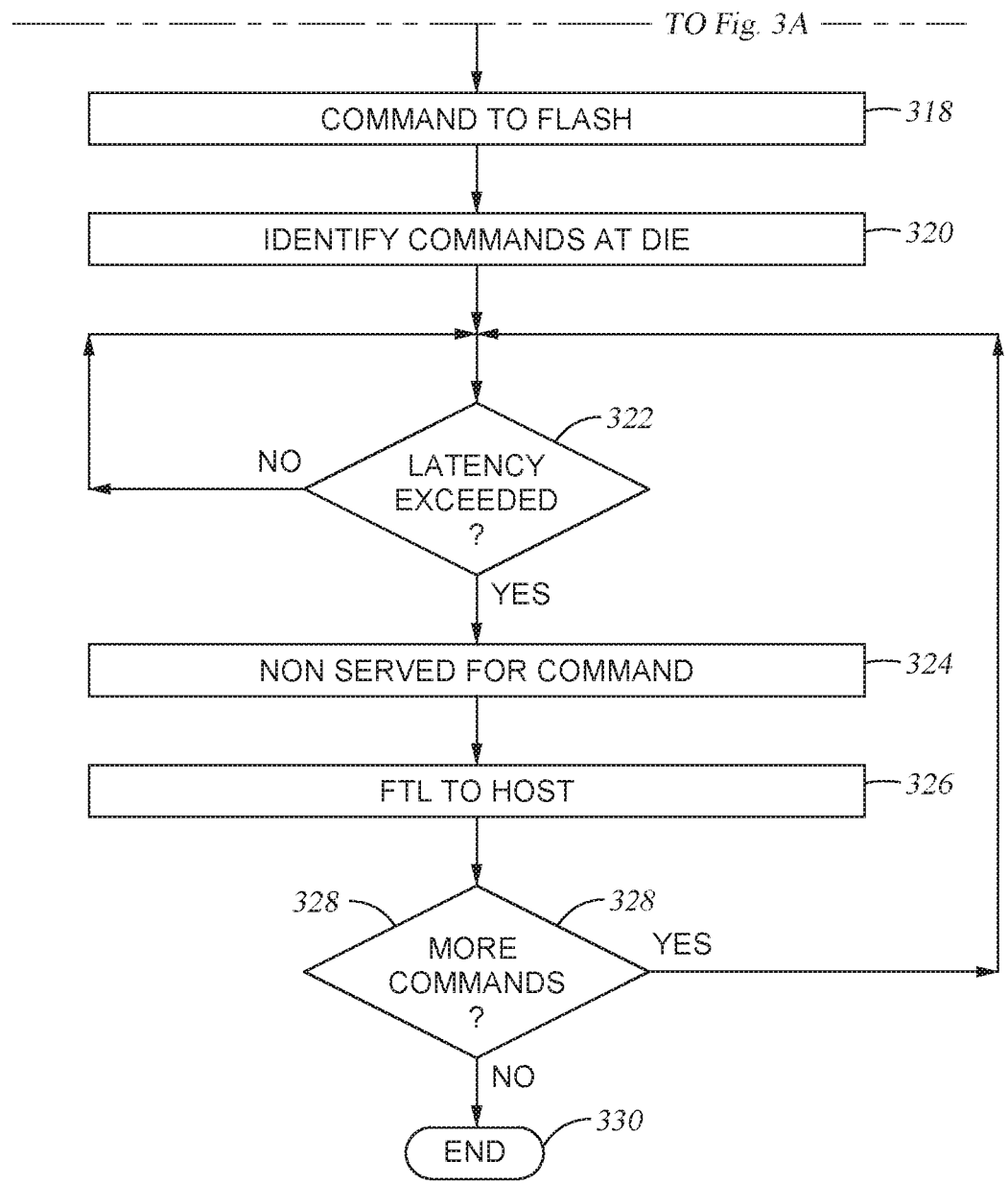

Referring to FIGS. 3A and 3B, another example method 300 is disclosed. The method starts at 302. The method proceeds to 304 where a command is received at the flash translation layer. The command is timestamped at 306. The command is then added to a queue or "heap" of commands that need to be processed at 308. A timer is started at 310 when the command is added to the heap.

The queue can store the time for the next command "timeout", the period of time when a latency threshold will be exceeded. In the method described, a single timer is used for the next command. In other embodiments, multiple timers may be used, one for each command in the "heap". At 312, a query is run to determine if the timer started at 310 has expired. If the timer has not expired for the next command to be performed in the heap, then the method loops back to 312 where the timer is checked again. If, at 312, the query is run and the timer has expired, then, at 314, the heap is checked to see if any of the individual commands have exceeded their time out. If, a command is expired, then a notification is sent back to the host at 316 that a "timeout" has occurred. If a command has not expired the timeline, then the command stays in the heap. In embodiments that the command has exceeded the time out, the command may be removed from the heap. If during the process a command is transferred to the flash memory, as provided at 318, then the flash management module ("FMM") on receipt of a command from the FTL identifies number of commands currently in flight to a specific NAND die 320. As will be understood, the number of commands being processed ("in flight") may be tracked. If, during the process, a command is transferred to flash memory, the system may execute the command/pass the command to the NAND as soon as the NAND is available to process the command. A query is then run at 322 to determine if the number of commands exceeds the latency defined per command. If the latency exceeds the latency per command, the FM will immediately respond to the FTL with a message of "non-service" at 324. The FTL can then send, at 326, the "non-service" command response to the host. A query is then run at 328 to determine if there are more commands to check. If there are no more commands to check, then the method ends at 330. If there are more commands to check, then the method loops to 322.

In the above, since the command is never sent to the NAND, there is no need to continue tracking the command at the HIM level. To make the determination about whether the command could be serviced in sufficient time, the flash memory may use knowledge of the command time, such as sense time on the NAND die, number of commands in the die queue, and transfer time on the bus (channel).

The overall solution provides a bounded latency, where the device, such as a solid state drive, would report "non-service" of a command at the defined system level timeout or earlier if the device was unable to successfully return the data to the host.

In one embodiment, a solid state drive includes a host interface module, a plurality of NAND flash memories coupled to a NAND die, and a controller coupled to the host interface module and the NAND die. The controller includes a flash translation layer. The controller is configured to receive a command at the flash translation layer, timestamp the command received at the flash translation layer, add the command received at the flash translation layer to a queue, start a timer when the command is added to the queue, wherein a value of the timer is set according to a required latency threshold, perform a query to determine if the value for the timer has exceeded the required latency threshold, check, when the timer has exceeded the required latency threshold, each of the commands in the queue to determine if the required latency threshold has been exceeded, and send a message to a host that the latency threshold has been exceeded for each command in the queue.

The queue comprises other commands. The solid state drive further includes a memory device. The controller is further configured to remove each command in the queue that has exceeded the latency threshold. The commands are received at the solid state drive. The solid state drive is a hybrid drive and the commands are received at the hybrid drive. The solid state drive is a hard disk drive and the commands are received at the hard disk drive.

In one embodiment, a method is disclosed comprising receiving a command at a flash translation layer; timestamping the command received at the flash translation layer; adding the command received at the flash translation layer to a queue; starting a timer when the command is added to the queue, wherein a value of the timer is set according to a required latency threshold; performing a query to determine if the value for the timer has exceeded the required latency threshold; when the timer has exceeded the required latency threshold, checking each of the commands in the queue to determine if the required latency threshold has been exceeded and sending a message to a host that the latency threshold has been exceeded for each command in the queue.

In another example embodiment, the method may be performed wherein other commands are in the queue.

In another example embodiment, the method may be performed wherein the method occurs in a memory device.

In another example embodiment, the method may further comprise removing each command in the queue that has exceeded the latency threshold.

In another example embodiment, the method may be performed wherein the command is received at a solid state drive.

In another example embodiment, an apparatus is disclosed comprising: memory means with at least two die, means for receiving commands at a flash translation layer, wherein the command is required to be performed at a specific die; means for timestamping received commands at the flash translation layer; means for adding the command received at the flash translation layer to a queue, means for starting establishing a lapsed time when the command is added to the queue, means performing a query to determine if the value for the timer has exceeded the required latency threshold and when the timer has exceeded the required latency threshold, means for checking each of the commands in a queue to determine if the required latency threshold has been exceeded.

In another example embodiment, the arrangement may further comprise means for sending a message to a host that a latency threshold has been exceeded for each command in the queue.

In another example embodiment, the arrangement may further comprise means for checking the commands in the queue for a latency for completion compared to the latency threshold and means for notifying a host for each command where an expected completion latency exceeds the latency threshold.

In another example embodiment, the arrangement may further comprise means for removing each command in the queue that has exceeded the latency threshold.

In a still further embodiment, the arrangement may be configured wherein the memory means is NAND based.

In another example embodiment, an arrangement is disclosed comprising means for receiving a command at a flash translation layer, wherein the command is required to be performed at a specific die, means for timestamping commands received at the flash translation layer, means for providing a queue of commands received at the flash translation layer, means for starting a timer when the command is added to the queue and means for checking the commands in the queue, per die, for a latency for completion compared to the latency threshold.

In a further example embodiment, the arrangement may further comprise means for notifying a host for each command where an expected completion latency at a die exceeds the latency threshold.

In another example embodiment, the arrangement may further comprise memory means for storing data.

In another example embodiment, the arrangement may be configured wherein the memory means is NAND based.

While the foregoing is directed to embodiments of the present disclosure, other and further embodiments of the disclosure may be devised without departing from the basic scope thereof, and the scope thereof is determined by the claims that follow.

What is claimed is:

1. A solid state drive, comprising:
a controller configured to:
  receive one or more commands at a flash translation layer;
  timestamp each command received at the flash translation layer, a timestamp of the respective command indicating a time when a latency threshold of the respective command will be exceeded;
  add each command received at the flash translation layer to a queue;
  determine, for a next command to be performed in the queue, whether the respective command has timed out before being transferred from the queue for being performed based on the timestamp of the respective command; and
  send, for a command that has been determined to be timed out, a message to a host that the respective command has timed out.

2. The solid state drive of claim 1, wherein receiving the one or more commands at the flash translation layer includes receiving multiple commands at the flash translation layer.

3. The solid state drive of claim 1, wherein the flash translation layer is disposed in a memory device, and the memory device performs the receiving the one or more commands, the timestamping each command, the adding the command to the queue, the determining whether a command has timed out, and the sending the message to the host.

4. The solid state drive of claim 1, wherein the controller is further configured to:
  remove from the queue each command that has been determined to be timed out.

5. The solid state drive of claim 1, further comprising:
an interface, wherein the interface is configured to:
  timestamp each command received at the flash translation layer, a timestamp of the respective command indicating a time when a latency threshold of the respective command will be exceeded;
  manage one or more data requests from flash memory;
  determine instances of when a timed out condition is present; and
  limit the flash translation layer from sending timed out conditions for activities that have already been notified as timed out.

6. The solid state drive of claim 1, further comprising:
one or more flash memories coupled to the controller, wherein the one or more flash memories store data associated with the one or more commands.

7. The solid state drive of claim 6, wherein the one or more flash memories comprises one or more dies.

8. A solid state drive, comprising:
a controller is configured to:
  receive one or more commands at a flash translation layer, wherein each command is required to be performed at a specified die;
  timestamp each command received at the flash translation layer, a timestamp of the respective command indicating a time when a latency threshold of the respective command will be exceeded;
  add each command received at the flash translation layer to a queue;

determine, for a next command to be performed in the queue, whether the respective command has timed out before being transferred to the specified die based on the timestamp of the respective command;

send, for a command that has been determined to be timed out, a message to a host that the respective command has timed out;

determine, for a next command to be performed in the queue that has not timed out, whether the respective command is expected to time out based on a latency for completion and the timestamp of the respective command, the latency for completion being based on a number of commands to be processed (i) before the respective command and (ii) by the specified die that is to perform the respective command; and notify, for a next command that is determined to be expected to time out, the host that the respective command is expected to time out.

9. The solid state drive of claim 8, wherein receiving the one or more commands at the flash translation layer includes receiving multiple commands at the flash translation layer.

10. The solid state drive of claim 8, wherein the controller is further configured to:

remove from the queue each command that has been determined to be timed out.

11. The solid state drive of claim 8, wherein the controller is further configured to:

determine, for each command in the queue, whether the respective command has timed out before being transferred to the specified die based on the timestamp of the respective command; and determine, for each command in the queue that has not timed out, whether the respective command is expected to time out based on the respective latency for completion and the timestamp of the respective command.

12. The solid state drive of claim 8, further comprising: an interface, wherein the interface is configured to:

timestamp each command received at the flash translation layer, a timestamp of the respective command indicating a time when a latency threshold of the respective command will be exceeded;

manage one or more data requests from flash memory;

determine instances of when a timed out condition is present; and limit the flash translation layer from sending timed out conditions for activities that have already been notified as timed out.

13. The solid state drive of claim 8, further comprising: one or more flash memories coupled to the controller, wherein the one or more flash memories store data associated with the one or more commands.

14. The solid state drive of claim 13, wherein the one or more flash memories comprises one or more dies.

15. A solid state drive, comprising:

a controller is configured to:

receive one or more commands at a flash translation layer, wherein each command is required to be performed at a specified die;

timestamp each command received at the flash translation layer, a timestamp of the respective command indicating a time when a latency threshold of the respective command will be exceeded;

add each command received at the flash translation layer to a queue;

determine, for a next command to be performed in the queue that has not timed out, whether the respective command is expected to time out based on a latency for completion and the timestamp of the respective command, the latency for completion being based on a number of commands to be processed (i) before the respective command and (ii) by the specified die that is to perform the respective command; and notify, for a next command that is determined to be expected to time out, a host that the respective command is expected to time out.

16. The solid state drive of claim 15, wherein receiving the one or more commands at the flash translation layer includes receiving multiple commands at the flash translation layer, wherein the multiple commands are to be performed by a memory arrangement.

17. The solid state drive of claim 15, wherein the controller is further configured to:

remove from the queue each command that has been determined to be timed out.

18. The solid state drive of claim 15, further comprising: an interface, wherein the interface is configured to:

timestamp each command received at the flash translation layer, a timestamp of the respective command indicating a time when a latency threshold of the respective command will be exceeded;

manage one or more data requests from flash memory;

determine instances of when a timed out condition is present; and limit the flash translation layer from sending timed out conditions for activities that have already been notified as timed out.

19. The solid state drive of claim 15, further comprising: one or more flash memories coupled to the controller, wherein the one or more flash memories store data associated with the one or more commands.

20. The solid state drive of claim 19, wherein the one or more flash memories comprises one or more dies.

* * * * *